Dec. 21, 1943.   H. G. FREEMAN   2,337,321
VALVE
Filed Sept. 12, 1942
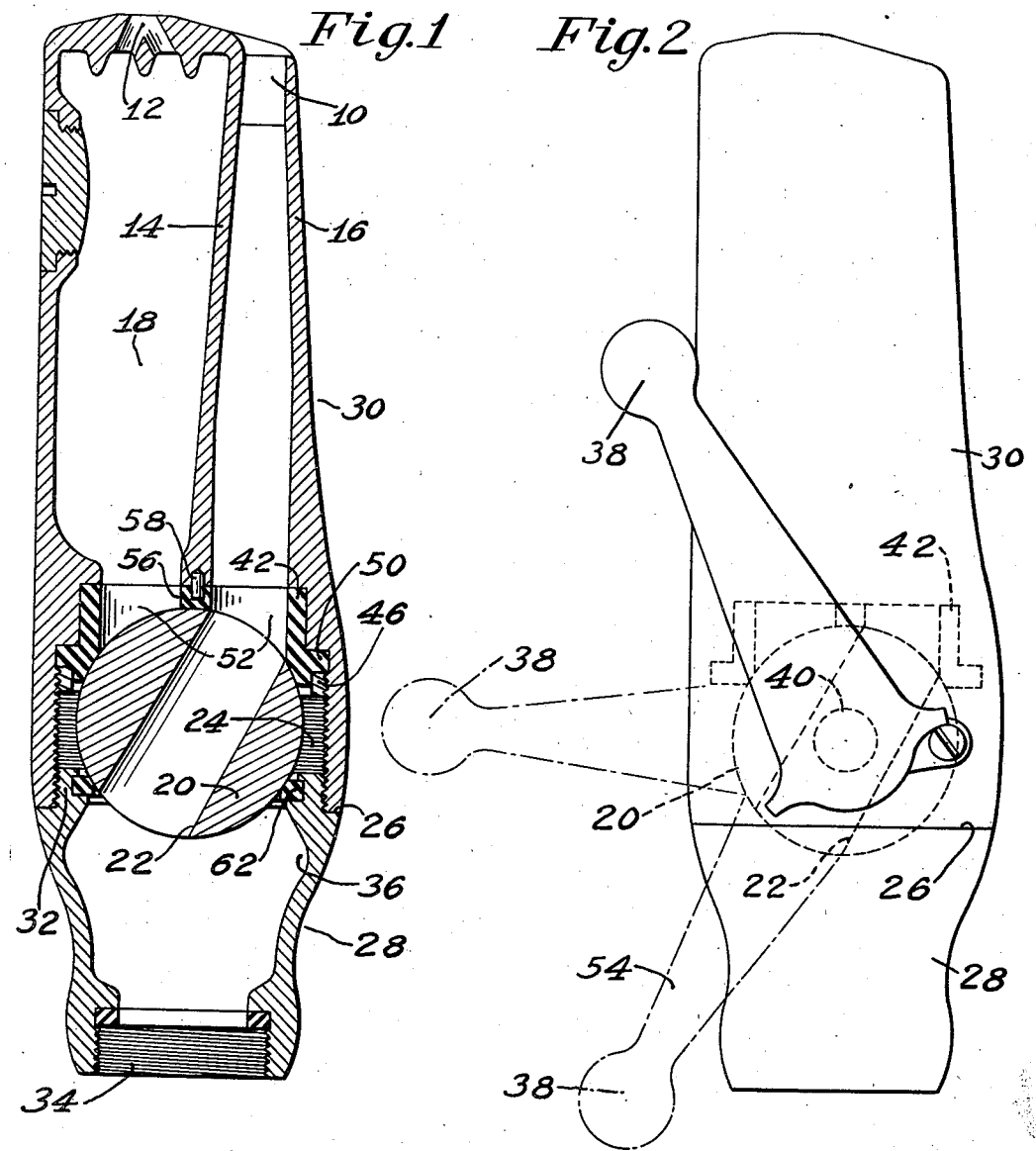
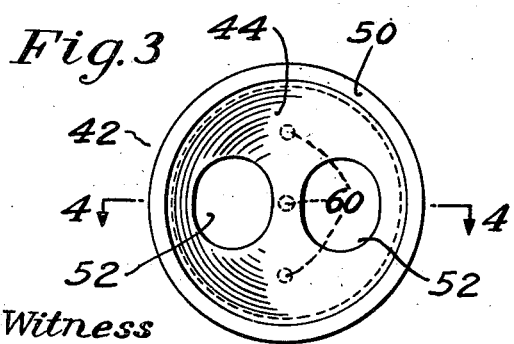
Witness
Charles J. Olson
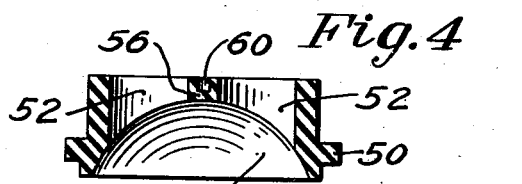
Inventor
Howard G. Freeman
by his attorneys
Fish Hildreth Cary & Jenney

Patented Dec. 21, 1943

2,337,321

UNITED STATES PATENT OFFICE 2,337,321

VALVE

Howard G. Freeman, Worcester, Mass., assignor to Rockwood Sprinkler Company, Worcester, Mass., a corporation of Massachusetts Application September 12, 1942, Serial No. 458,090

4 Claims. (Cl. 251—113)

The present invention relates to valves of the type which employ a spherical or ball valve member as the fluid-controlling element, and is concerned more particularly with ball valves having a plurality of separate ports selectable by rotating the valve ball.

Ball valves of the single port type have of course been extensively employed, as they possess numerous advantages such as ease of manufacture and ability to provide long trouble-free service. These advantages are derived in large part from the fact that the valve seat is generally a narrow annulus of spherical contour, against which the valve ball seats automatically in all positions under the fluid pressure.

For many purposes, however, a multiple port valve is required. In the case of a combination fire nozzle, for example, having both stream and fog discharge aperture, it is necessary to be able to select either one or the other type of discharge, in addition to shutting the stream off altogether. In attempting to retain the advantages of the ball-type valve in an application of this sort, substantial difficulties have been encountered, due to the several requirements which such a valve must meet. It is important that the loss of head, or pressure drop, through the valve must be kept as low as possible, particularly for valves for use with fire-fighting nozzles. Furthermore, the valve must be substantially leakproof in closed position, yet must turn freely even under high fluid pressures which tend to cause the valve ball to bear against the seat with substantial force.

In a ball-type valve having a plurality of ports, the valve seat of course differs considerably from the simple annular seat which suffices for a single port shut-off valve. Since fluid-tight seating must exist as between the separate ports, the seat must necessarily engage a substantial portion of the spherical surface of the ball, in order that the varoius ports may be of adequate size and yet each separately open into the ball-engaging surface of the seat. A seat of this design has not been found practical when made of metal, being easily damaged by any particles of sand or grit that inevitably work in between seating surfaces.

With the substitution of resilient material in place of metal for the seat, problems of abrasion may be minimized. Other problems arise, however, which present serious difficulties in the way of providing a satisfactory seat capable of meeting the requirements heretofore outlined. The factors influencing the performance of a spherical seat of resilient material in a multiple port valve wherein the seat must engage a substantial portion of the hemisphere of the valve are to a large extent based on distortion of the seat under the various pressures and forces encountered. For example, there is a marked tendency of the ball to bury itself in the seat when the valve is off and fluid pressure at maximum, frequently of the order of 500–600 lbs. per square inch, resulting in the ball becoming locked or jammed so as to be turned only with great difficulty.

It is in view of these considerations that the invention contemplates, as an object, the provision of a ball-type multiple port valve of such design and construction as to avoid the drawbacks heretofore present in such valves, and to afford instead fluid-tight seating, minimum pressure drop, easy operation and long life.

A feature of the invention involves the provision of a multiple port seat for such valve, the seat being formed of resilient non-metallic material and embracing a substantial portion of a hemisphere of the valve ball in order that the ports in the seat may be of a size to provide but little restriction to fluid flow through the valve, the seat being so shaped and the resilient material therein so distributed that distortion of the seat under the various conditions of pressure and valve position is substantially avoided.

In the drawing illustrating the invention, Figs. 1 and 2 are sectional and outline views, respectively, of a combination fog and stream nozzle having a ball-type shut-off and selector valve, constructed in accordance with the invention, and Figs. 3 and 4 are plan and sectional views of the special valve seat employed in the valve.

The nozzle in which the valve is embodied for purposes of illustration is a combination stream and fog nozzle, having separate stream and fog discharge apertures 10 and 12, respectively. A partition 14 separates the tapering passage 16 of the stream nozzle from the chamber 18 which supplies the intersecting discharge aperture 12 of the fog or spray portion of the nozzle.

The nozzle discharge is selected and controlled by means of a ball valve member 20 having a passage 22 extending diametrically therethrough. The valve ball is located in a valve chamber 24 within the slightly enlarged portion of the nozzle body, the nozzle casing being separable along a line 26 into inlet and discharge sections 28 and 30 to permit insertion of the valve ball in the chamber. The chamber 24 is internally threaded to receive the reduced threaded end 32 of the inlet section of the casing. The free end 34 of the inlet section is internally threaded for connection to a hose or pipe. The diameter of the inlet casing adjacent the valve ball is considerably greater than the diameter of the valve passage 22 so that the valve may be turned through an angle something more than twice the angle subtended by the passage opening in the valve ball before cut-off begins. To provide satisfactory flow characteristics, the interior of the inlet casing 28 preferably increases in size from the connector end to a point 36, a short distance from the valve ball, the casing then tapering inwardly toward the ball. The ball is turned by means of handle 38 on shaft 40 rotating about an axis which passes through the center of the ball transversely of the fluid passage 22.

The discharge side of the valve chamber is formed with a cylindrical bore within which the valve seat 42 is received. This seat is formed of resilient non-metallic material such as rubber or a material having rubber-like properties, a synthetic rubber capable of resisting the effects of oil or grease preferably being employed. The seat is in the general shape of a cylindrical plug, one end of which is formed with a cupped or concave surface 44 of substantially the same radius of curvature as the valve ball. The diameter of the seat body and the depth of the concavity are such that a substantial portion of a hemisphere of the ball is engaged.

The seat is retained in position in the seat-receiving bore in the casing by means of a retaining ring 46 threaded to engage the inter-threads surrounding the valve chamber. This retaining or clamping ring, instead of directly engaging the body of the seat, with the likelihood of distorting the ball engaging surface of the seat through axial compression of the seat body, engages instead a flange 50 formed integrally with and projecting outwardly from the body portion of the seat, the flange being supported by the shoulder formed by the base of the valve chamber. As a result of this arrangement, the retaining ring may be tightened on the flange without appreciably altering the shape of the seat through bodily compression of the seat as a whole.

To provide passage of the fluid through the valve ball to one or the other of the nozzle apertures, the valve seat is provided with spaced fluid passages 52 which register with the openings to the passage for the stream nozzle and the chamber for the spray nozzle, respectively. The valve seat passages have their axes parallel, and are non-circular in cross section, being slightly elongated as shown in Fig. 3 to increase their flow capacity without unduly narrowing the width of the seal between the passages or at the rim of the seat. Furthermore, since the axes of the passage are not directed radially of the valve ball, the elongated cross-sectioned shape of passage permits a close approximation of registration between the seat passages and the obliquely intersecting passage 22 through the valve ball.

Through the provision of a seat whose ball engaging surface embraces a substantial portion of the ball, these fluid passages may be large enough for proper fluid flow and still have their openings lie wholly within the spherical ball-engaging surface of the seat for complete and effective sealing when the valve passage is in register with one or the other of the passages in the seat. On the other hand, when the valve ball is rotated to place the passage crosswise of the center line of the valve, represented by handle position 54 in Fig. 2, all fluid flow is effectively cut off.

To prevent distortion of the valve seat under high fluid pressure in spite of its resilient non-metallic character, the invention contemplates that the depth of the dividing wall or partition 56 between the passages 52 in the seat shall, in general, not be substantially greater than its thickness, so that there will be no tendency of this wall to tilt and thus cause binding of the valve ball or catching of the edge of the ball passage on the wall as the valve is turned to change the flow from one passage to the other. As an added safeguard against displacement of the valve seat and this dividing partition in particular, positioning pins 58 are provided. These pins are set in the nozzle body along a line between the casing openings which register with the valve seat passages 52, and fit into registering recesses 60 formed in the seat. Thus, rotation of the seat in the nozzle is prevented, as well as lateral distortion or displacement of the seat material and especially the portion of the seat forming the partition 56. Furthermore, the body of the seat is confined by the casing against outward expansion and by the base of the bore against movement in the direction of flow, this support extending into the immediate vicinity of the passages in the seat and including direct support for the dividing wall 56, with the result that distortion of the spherical surface of the seat and consequent jamming or locking of the valve ball is effectively prevented, even under pressures which may reach 500 or 600 lbs. per square inch or higher.

When the nozzle is in operation and is being supplied with fluid under pressure, the valve ball is of course held against the seat, with great force when the valve is in "off" position and with far less but nevertheless appreciable force when the valve is in one or the other of the "open" positions. When fluid pressure is removed, however, the ball becomes free and unless otherwise constrained might drop away from the seat. To prevent damage to the ball and to retain it in place in engagement with the seat, a retaining or backing ring 62 is provided on the inlet side of the valve chamber. Metal to metal contact is avoided and compensation for minor variations in the dimensions of the parts is provided by making the ring 62 of resilient non-metallic material, like that of the seat. This ring is received within a groove in the end 32 of the inlet section of the casing and makes a narrow annular contact with the valve ball when the nozzle is out of operation and no fluid is being supplied thereto.

The invention thus provides a multi-port ball-type valve possessing the advantages of durability and long life afforded by a non-metallic seat, yet is freely rotatable and leak-proof over the extremely wide range of pressures encountered between "off" and "on" positions. While the valve has been shown and described as embodied in a combination nozzle for fire extinguishing purposes, this is merely by way of illustration, the valve per se having numerous and varied other applications and uses.

Having thus described the invention, I claim:

1. A valve seat for a valve employing a rotatable valve-ball having a passage therethrough, said seat comprising a body of resilient non-metallic material having a ball-engaging surface of spherical contour, the seat having an integral flange portion projecting outwardly from the body of the seat to permit securing the seat in the valve without distorting the body of the seat.

2. A multi-port valve, comprising a casing having a plurality of ports, a valve chamber, a ball valve member having a passage therethrough and rotatable within the valve chamber to direct the passage toward one or another of the ports or to shut off flow through the valve, a valve seat comprising a cylindrical body of rubber-like material having a ball-engaging face of spherical contour to engage a substantial portion of a hemisphere of the valve ball, the valve seat having separate passages therethrough extending from the ball-engaging surface into registry with the ports in the valve casing, said casing being shaped to support and confine the seat in the immediate vicinity of the passages therein to prevent distortion of the seat under pressure.

3. A multi-port valve comprising a casing having a plurality of ports, a valve chamber, a ball valve member having a passage therethrough and rotatable within the chamber to direct the passage toward one or another of the ports or to shut off flow through the valve, a valve seat chamber on the discharge side of the ball valve having a bottom surface into which the ports open, a valve seat within the seat chamber, said seat comprising a body of rubber-like material having a ball-engaging face of spherical contour to engage a substantial portion of a hemisphere of the valve ball, the seat having separate passages therethrough extending from the ball-engaging surface into registry with the ports in the bottom of the valve seat chamber, an integral flange projecting outwardly from the valve seat body and seated on a shoulder formed in the casing adjacent the top of the valve seat chamber, a retaining ring clamping the flange against the shoulder, and means projecting from the bottom of the valve seat chamber into the valve seat for positioning and reenforcing the seat.

4. A valve comprising a casing having a discharge port, a valve chamber in the casing, a ball valve within the chamber having a passage therethrough, a valve seat on the discharge side of the valve chamber having a ball-engaging surface of spherical contour, said seat being formed of resilient non-metallic material and having an integral flange projecting outwardly from the body of the seat, and means for clamping the flange in the casing, whereby the valve seat is secured in position with the body of the valve substantially free of distortion in shape.

HOWARD G. FREEMAN.